United States Patent [19]

Winkler

[11] Patent Number: 5,731,862
[45] Date of Patent: Mar. 24, 1998

[54] HYPEROCULAR LENS ASSEMBLY ATTACHABLE TO AN EYEGLASS LENS

[75] Inventor: Kurt Winkler, Rosstal, Germany

[73] Assignee: Eschenbach Optik GmbH + Co., Germany

[21] Appl. No.: 837,950

[22] Filed: Apr. 28, 1997

Related U.S. Application Data

[63] Continuation of Ser. No. 499,561, Jul. 7, 1995, abandoned.

[30] Foreign Application Priority Data

| Jul. 8, 1994 | [DE] | Germany | 9410741 U |
| Jul. 14, 1994 | [DE] | Germany | 9411416 U |

[51] Int. Cl.$^6$ .................... G02C 9/00; G02C 7/08
[52] U.S. Cl. .................................. 351/47; 351/57
[58] Field of Search .................. 351/41, 47, 54, 351/55, 57, 158, 58; 359/802, 804, 809, 810

[56] References Cited

U.S. PATENT DOCUMENTS

| 2,393,959 | 2/1946 | Blumenthal . | |
| 2,706,430 | 4/1955 | Miller | 351/55 |
| 4,645,317 | 2/1987 | Frieder et al. . | |
| 4,796,986 | 1/1989 | Growdy, Jr. | 351/57 |
| 4,997,268 | 3/1991 | Dauvergne . | |
| 5,056,906 | 10/1991 | Akiyoshi | 351/57 |
| 5,071,244 | 12/1991 | Ross . | |
| 5,243,366 | 9/1993 | Blevins . | |
| 5,266,977 | 11/1993 | Linden | 351/47 |
| 5,349,393 | 9/1994 | Kreft . | |
| 5,478,824 | 12/1995 | Burns et al. | 351/172 |

FOREIGN PATENT DOCUMENTS

| 0178014A2 | 4/1986 | European Pat. Off. . |
| 341998 | 11/1989 | European Pat. Off. . |
| 979220 | 4/1951 | France . |
| 1538221 | 8/1968 | France . |
| 1690123 | 10/1954 | Germany . |
| 1787396 | 2/1959 | Germany . |
| 1276363 | 8/1968 | Germany . |
| 3905041A1 | 8/1990 | Germany . |
| 5-232411A | 12/1993 | Japan . |
| 5-273502A | 1/1994 | Japan . |

OTHER PUBLICATIONS

Rumney, Nicholas, "Low Vision Enhancement". *Optician*, Nov. 8, 1991, pp. 12–14.

Mann, Dieter, "Vergrössernde optische Sehhilfen für Sehbehinderte". *Der Augenoptiker*, Feb. 1980, No. 2, pp. 23–28.

Methling, D., "Vergrössernde Sehhilfen und ihre Anwedungsmöglichkeiten". *Augenoptik–Berlin* 102, 1985, 4, pp. 99–104.

*Primary Examiner*—Hung X. Dang
*Attorney, Agent, or Firm*—Spencer & Frank

[57] ABSTRACT

A hyperocular lens assembly attachable to an eyeglass lens includes a lens, and a holding frame at least partially surrounding the lens. The holding frame has an end face facing the eyeglass lens that is attachable to the eyeglass lens at one of a location behind and before the eyeglass lens. The end face has a contour corresponding to a surface contour of the eyeglass lens.

13 Claims, 6 Drawing Sheets

FIG. 10     FIG. 9
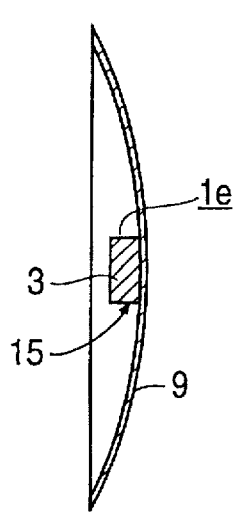
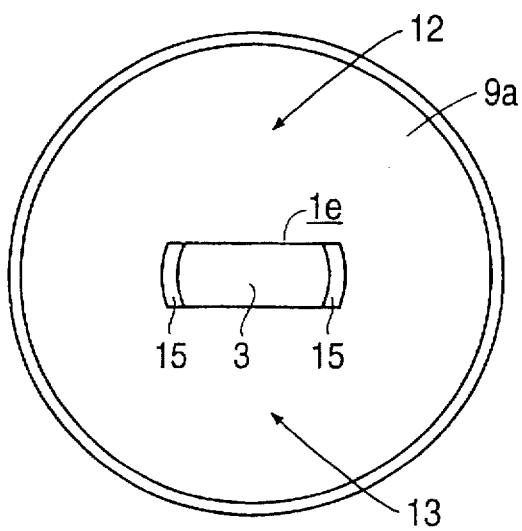
FIG. 12     FIG. 11
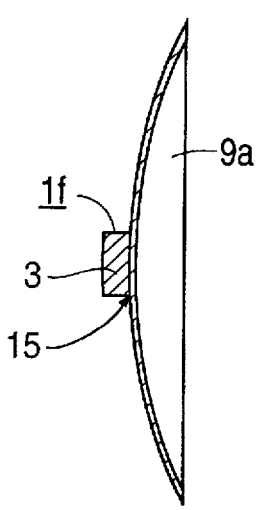
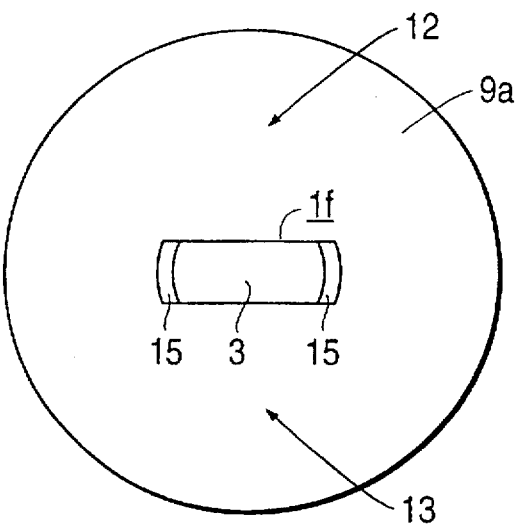
FIG. 13     FIG. 15
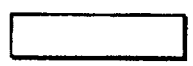
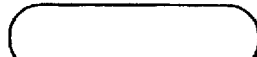
FIG. 14     FIG. 16     FIG. 17
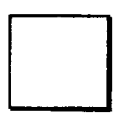
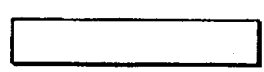

FIG. 20A
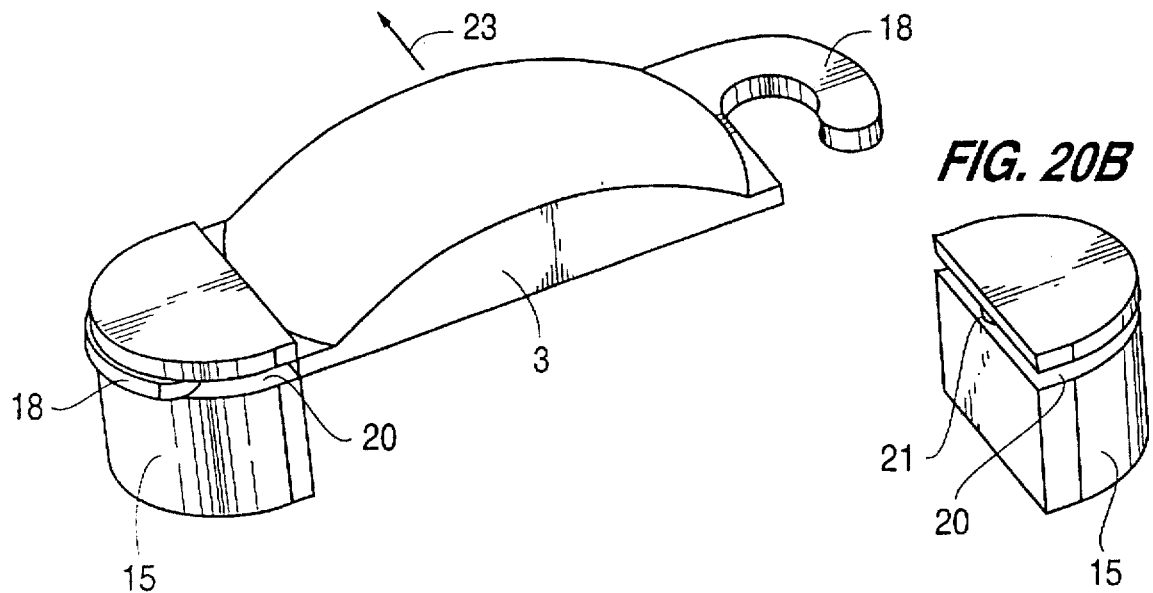
FIG. 20B
FIG. 21
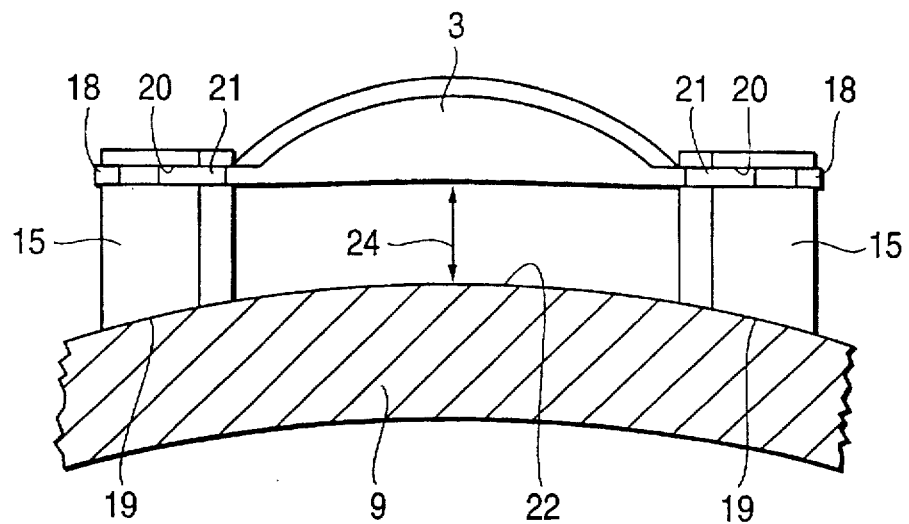

HYPEROCULAR LENS ASSEMBLY ATTACHABLE TO AN EYEGLASS LENS

This application is a continuation of application Ser. No. 08/499,561, filed Jul. 7, 1995 now abandoned.

CROSS-REFERENCE TO RELATED APPLICATIONS

This application claims the priority of German application Ser. No. G 94 10 741.6, filed Jul. 8, 1994, and German application Serial No. G 94 11 416.1, filed Jul. 14, 1994, which are incorporated herein by reference.

BACKGROUND OF THE INVENTION

Persons with severe vision defects often wear glasses having so-called hyperoculars (low vision lens). These glasses have lenses that greatly magnify and that are used as accommodation and magnification attachments for reading purposes. Typically, these glasses have a sixfold to twelvefold magnification.

To avoid having to change glasses, it is known to grind the hyperocular lens into a portion of a conventional eyeglass lens. Such an eyeglass lens, also known as a bifocal lens, is suitable, for example, for both close-up (using the hyperocular lens) and distance (using the conventional eyeglass lens) vision. However, the ground-in hyperocular lens gives the wearer of the glasses a facial expression which is often perceived as being disturbing. Furthermore, the range of magnification is limited.

Commercially available hyperoculars are known which are configured as a clip-on lens attachment. Such clip-on lens attachments are very noticeable, and can be irritating to the wearer. Moreover, the clipping on and off of the lens attachment is not practical.

From the publication "Univision—Low Vision Lens—", Unilens Corp., USA, 1993, a hyperocular lens made of acrylic is known which is attached before the eyeglass lens using an adhesive film. A side of the hyperocular lens facing the eyeglass lens is adapted to the surface contour of the eyeglass lens. However, this hyperocular lens is only suitable for magnification up to a factor of ten.

In U.S. Pat. No. 5,266,977 a hyperocular lens is described in which the lens holding frame is configured in the manner of a suction cup. The side of the holding frame facing the eyeglass lens in the mounted position is provided with an obliquely extending suction cup wall which is configured in the manner of a peripheral surface of a truncated cone, with the suction cup wall being pressed onto the surface of the eyeglass lens and clinging to the surface in the manner of a suction cup to attach the hyperocular lens. The drawback of the prior art hyperocular lens lies in the fact that the holding frame inevitably must be a ring which is integrally closed so that a closed vacuum space can be created between the surface of the eyeglass lens and the hyperocular lens. Therefore, a partial framing of the hyperocular lens or even an attachment at several spots is not possible. Another drawback is the fact that, inevitably, there is a relatively large distance between the before-the-lens surface of the eyeglass lens and the hyperocular lens. This distance is dictated by the return movement of the suction cup wall after the suction cup wall of the hyperocular lens has been pressed onto the surface of the eyeglass lens. A further drawback is the fact that the suction cup wall covers a relatively large region of the field of vision of the eyeglass lens in the manner of a ring. This region is lost as field of vision, even if the suction cup wall is made of a transparent material, since uncontrollable scattering effects and diffraction effects would occur here. Furthermore, this hyperocular lens can hardly be mounted on the behind-the-lens side of an eyeglass lens, since this side is curved in a concave manner which makes the suction cup-like attachment of the hyperocular lens more difficult.

In an article entitled "Low Vision Enhancement", which was printed in the November 1991 issue of the journal "OPTICIAN", a low vision aid is described in which a tube section serving as a tube is glued with its one end face before the lens on an eyeglass lens. Within this tube, a magnification lens is arranged such that the tube entirely surrounds the lens. In such low vision aids, the problem arises that it is very difficult to remove the lenses from the tube if, for example, they are to be exchanged for another one, for example, for a lens having greater magnification or if a damaged lens needs to be replaced.

SUMMARY OF THE INVENTION

It is an object of the invention to provide a hyperocular lens which can be easily secured on an existing eyeglass lens.

This is accomplished according to the invention by a hyperocular lens assembly attachable to an eyeglass lens, comprising: a lens; and a holding frame only partially surrounding the lens and having an end face facing the eyeglass lens that is attachable to the eyeglass lens at one of a location behind and before the eyeglass lens, said end face having a contour corresponding to a surface contour of the eyeglass lens.

According to a further embodiment of the invention, a hyperocular lens assembly is provided that is attachable to an eyeglass lens at one of a location behind and before the eyeglass lens, and comprises: a lens; and attachment means for fixing the lens to the eyeglass lens at a plurality of no more than three different spots. The attachment means mentioned here are meant to be understood as means with which the hyperocular lens is attached to the eyeglass lens either directly, for example, by way of gluing or a screw connection, or these are means which are only supported against the surface of the eyeglass lens. In the last-mentioned case, the further fixing of the hyperocular lens takes place by means of additional attachment means on the eyeglass lens such as, for example, a wire frame, a nylon thread or a rubber band.

To accomplish the stated objective, typically a holding frame is provided which at least partially surrounds the hyperocular lens. On an end facing the eyeglass lens, the holding frame is correspondingly adapted to the surface contour of the eyeglass lens. Depending on the thickness or strength of the hyperocular lens, the hyperocular lens may be positioned in the holding frame at a desired distance from the eyeglass lens to adjust the optical effect. Preferably, the holding frame is glued onto the eyeglass lens, and is attached either before or behind the eyeglass lens. The holding frame is correspondingly adapted to the contour of the eyeglass lens depending on which side of the eyeglass lens has been selected for attachment.

To achieve a linear transition between the two resulting vision regions, the hyperocular lens and, if necessary, the matching holding frame can be configured as a circle segment.

For severe vision defects, the normal eyeglass lens usually has a large curvature. This makes adhesion considerably more difficult when gluing on round hyperocular lenses. Thus, the hyperocular lens may be substantially fixed at least two spots, and alternatively at three spots, on the eyeglass lens, regardless of whether the hyperocular lens is attached before or behind the eyeglass lens. This type of advantageous mounting or fixing of the hyperocular lens to the eyeglass lens is particularly simple, resulting in dimensional stability, without requiring special adaptation. This advantageous mounting or fixing can be applied to many different hyperocular lens shapes, such as those that are described above and in the following examples.

Further, the attachment spots may be subdivided into partial attachment points. With partial attachment points, adhesion is largely independent of the curvature of the normal eyeglass lens, thus remedying any attachment problems.

Additionally, known bonding agents, having considerable thickness and flexibility, can be used which allow simple attachment or adaptation of the hyperocular lens to the eyeglass lens, without impairing adhesion, even where the eyeglass lens has a large curvature.

A further substantial improvement for severely vision-impaired persons can be obtained by mounting such a hyperocular lens, preferably having a narrow-to-wide shape (i.e., beam or rectangular shape), on a known bifocal eyeglass lens. Thus, a trifocal lens can be created in a simple manner having three ranges of vision. Such a trifocal lens can correct even the most severe vision impairments. The narrow, beam-shaped hyperocular lens configuration provides a wide, almost unlimited field of vision, with the beam-shaped vision section providing visual guidance for the wearer. In a trifocal application it is, of course, also possible to mount the hyperocular lens before or behind the eyeglass lens.

The hyperocular lens may be configured as a planoconvex, biconvex, aspheric or bi-aspheric lens having a diameter of approximately 10 to 30 mm and a maximum center thickness of up to approximately 10 mm. The outer contour of the hyperocular lens can have many different shapes, such as cornered shapes or circle segment shapes. However, oval shapes, or shapes rounded off at the corners are preferred for two-spot attachments. Regardless of the specific shape, a narrow, beam-shaped contour should be utilized.

Preferably, the hyperocular lens is fixed on the eyeglass lens using adhesive bonding, and in particular using an adhesive ring. If necessary, however, other attachment options may be applied, such as using a flexible wire structure, screws, clamps, nylon threads or suction holding devices. Visually favorable solutions are preferred.

The hyperocular lens according to the invention is very inconspicuous when mounted behind the eyeglass lens, thus creating an advantageous cosmetic effect for the wearer of the glasses. At the same time, due to the short distance from the eye to the lens, large fields of vision can be obtained using extremely small lens dimensions. Shapes other than a circular or square shape are particularly desirable due to their small size and low weight. Further, because of the advantageous method of attachment, magnifications of up to twenty times are possible. However, preferred applications are those, for example, that require a sixfold to twelvefold magnification.

A further advantageous configuration of the invention is in the hyperocular lens being attached to the attachment means or to the holding frame so as to be detachable. Therefore, it is possible to easily clean the region of the eyeglass lens surface disposed below or behind the hyperocular lens. This is useful, in particular, for hyperocular lenses having the shape of a circle segment or of a beam since here the region disposed behind the hyperocular lens, in particular, can become soiled easily. By means of the embodiment mentioned, it is possible in a simple manner to change the hyperocular lens—for example, for replacement.

BRIEF DESCRIPTION OF THE DRAWINGS

The invention, further advantages and details are explained in the following by way of embodiments and the drawings. The drawings show:

FIGS. 9, 10 and FIGS. 11, 12 illustrate a beam-shaped hyperocular lens assembly with two-spot attachment and being mounted behind and before the lens, respectively.

FIGS. 13 to 17 illustrate further shapes of a hyperocular lens.

FIGS. 20A to 22 illustrate embodiments of hyperocular lens assemblies in which the hyperocular lens is attached so as to be detachable.

DETAILED DESCRIPTION OF THE INVENTION

Figure 1:
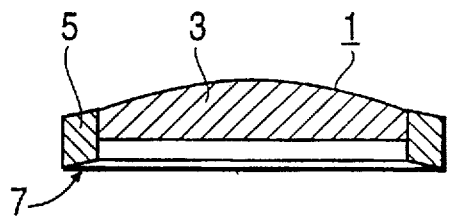
FIGS. 1 and 2 illustrate a hyperocular lens assembly for before-the-lens mounting.

FIG. 1 shows a cross section of a hyperocular lens assembly 1 for attachment before an eyeglass lens. The hyperocular lens 3 is surrounded by a holding frame or element 5 which holds the hyperocular lens 3 in place. To stably secure the entire arrangement, the holding frame 5 is provided with an end face 7 facing the eyeglass lens 9 and being adapted to the curvature of the eyeglass lens. In the present example, end face 7 has a concave configuration corresponding to an obtuse-angled ring taken from a peripheral surface of a cone. End face 7 is provided with an adhesive, not shown in detail. The adhesive on end face 7 may be achieved, for example, using an adhesive ring, a double-sided adhesive film or other suitable bonding techniques, such as gluing.

Figure 2:
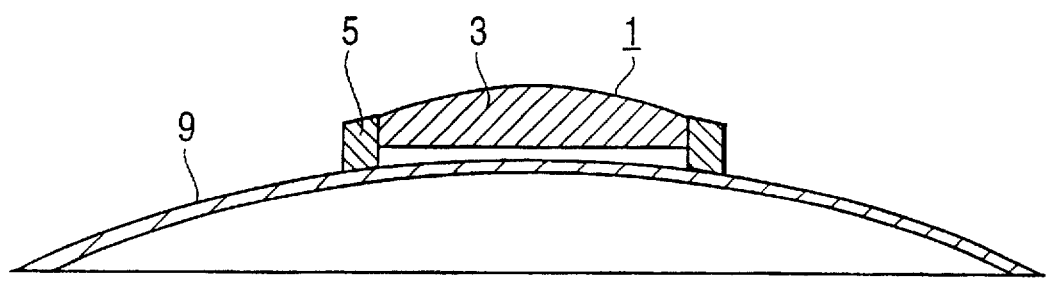

FIG. 2 shows the hyperocular lens assembly 1 mounted on the eyeglass lens 9. As shown, hyperocular lens 3 can be positioned at a distance from the eyeglass lens 9. Thus, different eyeglass lens curvatures can be compensated for.

Figure 3:
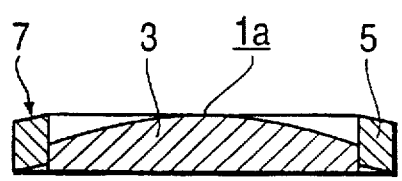
FIGS. 3 and 4 illustrate a hyperocular lens assembly for behind-the-lens mounting.
Figure 4:
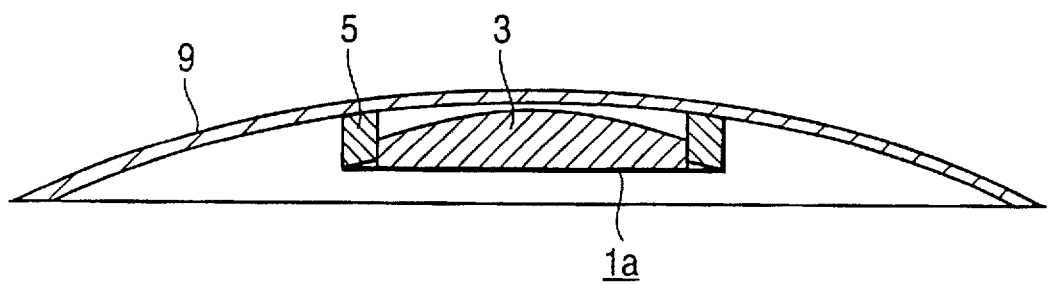
Figure 6:
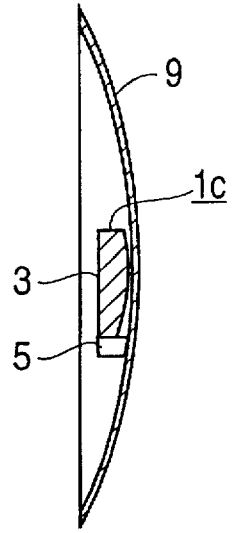
FIGS. 5, 6 and FIGS. 7, 8 illustrate a hyperocular lens assembly having a circle segment shape and being mounted behind and before the eyeglass lens, respectively.
Figure 5:
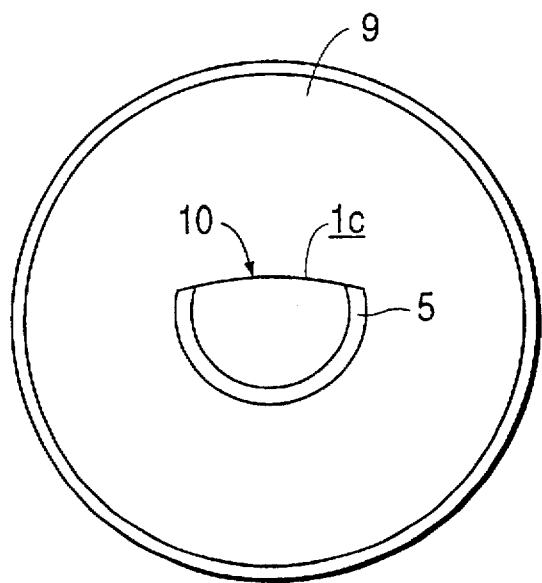

FIGS. 3 and 4 show a hyperocular lens assembly 1a as described above but for behind-the-lens positioning. As is clearly shown in FIG. 4, hyperocular lens 3 will now be much closer to the eye; thus its dimensions can be made smaller. Such a behind-the-lens positioning of hyperocular lenses has not been known prior to the present invention. In this embodiment, the end face 7 facing the eyeglass lens 9 has a convex configuration.

In all of the embodiments, the holding frame 5 is preferably made of a highly flexible or soft-plastic, synthetic material, such as a foam. This ensures a particularly good adaptation of the frame to the surface configuration of the eyeglass lens 9. The holding frame 5 advantageously allows the hyperocular lens 3 to be positioned at any place on and at any distance from the eyeglass lens surface.

Preferably, the hyperocular lens 3 is a non-spherical lens. Additionally, the hyperocular lens 3 is preferably made of a synthetic material and injection-molded in one piece. Alternatively, glass lenses may be used.

The FIGS. 5, 6 and 7, 8 show eyeglass lens arrangements in plan view and in cross section, and in which the hyperocular lens assembly 1c and 1d is attached behind eyeglass lens 9 and before eyeglass lens 9, respectively. Here, the hyperocular lens assemblies 1c and 1d have approximately the shape of a circle segment, with their upper edges 10 being approximately rectilinear, and with the holding frame 5 surrounding the circular arc-shaped edge of the lens.

Figure 7:
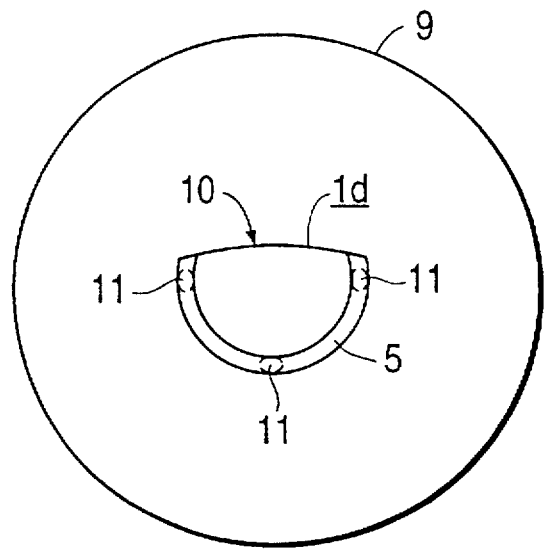
Figure 18:
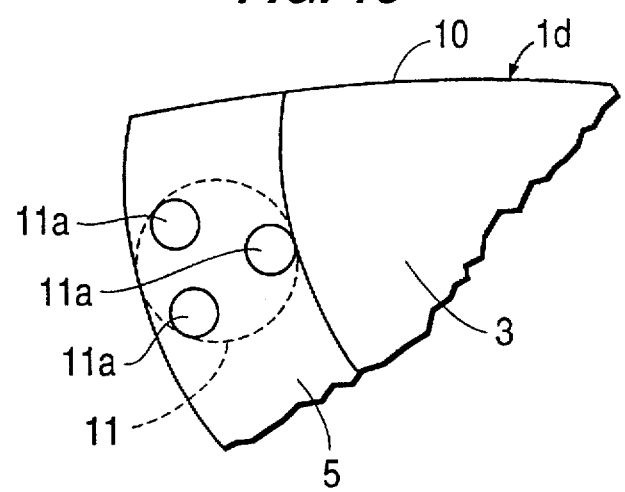
FIG. 18 illustrates a detail of a hyperocular lens assembly according to FIG. 7, wherein the spot-shaped retaining means are subdivided into partial attachment points.

The shape of the hyperocular lenses 3 shown in FIGS. 5 to 8 is suitable for attachment using the holding frame 5 and using a three-spot attachment. The three-spot attachment comprises spot-shaped retaining means 11 arranged between the eyeglass lens 9 and the hyperocular lens 3 in three places, as best shown in FIG. 7. The spot-shape retaining means 11 provides a particularly stable mounting position so that the hyperocular lens 3 is mounted to be resistant to shifting. For the two-spot or three-spot attachment, an attachment means, such as a double-sided adhesive tape, preferably having a suitable thickness to produce the required distance between the hyperocular lens 3 and the eyeglass lens 9, is particularly advantageous. If necessary, attachment can also occur using a synthetic or silicon material. The spot-shaped retaining means 11 may also be subdivided into several partial attachment points 11a, as is illustrated in FIG. 18. This further improves the attachment of a hyperocular lens on sharply curved eyeglass lens surfaces.

FIGS. 9, 10, 11, and 12 show arrangements in which a beam-shaped, or oblong, hyperocular lens assembly, 1e or 1f, is attached behind or before, respectively, a bifocal eyeglass lens 9. The illustrated shape shown corresponds to a segment of a circle. With the beam shape, attachment preferably occurs using an adhesive edge 15, which constitutes a holding element without the use of a holding frame. As shown, adhesive edge 15 extends over an entire width of the lens 3. If the eyeglass lens 9a is dimensioned for distance viewing in the upper region 12, and for close-up viewing in the lower region 13, the hyperocular lens range will occur in the center of the eyeglass lens 9a. The narrow-to-wide shape of the hyperocular lens assembly 1e or 1f creates a wide field of vision which offers visual guidance (orientation support), thus guiding the eyes of the wearer of the glasses. Thus, in addition to severe vision impairment, applications are conceived for certain jobs requiring extreme close-up vision, such as for jewelers or precision mechanics. Therefore, with such applications, it is no longer necessary to change glasses or to put on telescopic eyeglasses.

FIGS. 13 to 17 show further possible outer profiles of the hyperocular lenses. These hyperocular lenses are particularly well suited for a two-spot attachment to produce a trifocal eyeglass lens.

Figure 19:
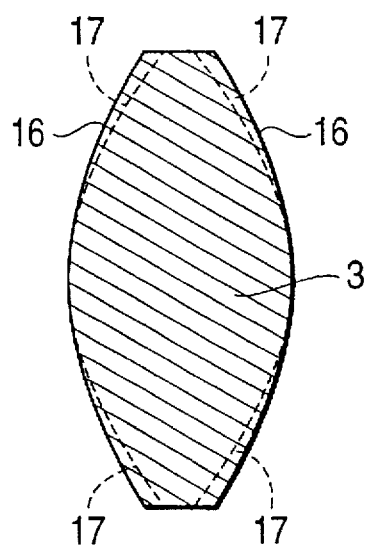
FIG. 19 illustrates a biconvex lens.

FIG. 19 illustrates a hyperocular lens 3 in biconvex configuration. The optically active surfaces of this lens may be curved spherically as well as aspherically. The spherical curvature is indicated by the continuous line 16. This line extends on a circular path. Correspondingly, the lens surface is a segment of a spherical surface. An aspherical shape of the optically active surface of the hyperocular lens 3 is indicated by the dotted lines 17. Here, the lens curvature deviates from the spherical surface shape and is more sharply curved towards the edge of the lens.

FIGS. 20A to 22 illustrate embodiments of a hyperocular lens assembly according to the invention in which the hyperocular lens 3 is attached to the attachment means or to the holding frame so as to be detachable. In the embodiment according to FIGS. 20A, 20B, and 21, a snap hook 18 is respectively formed to the narrow edges of a beam-shaped lens 3. Both snap hooks 18 open up toward the same side, and extend in a plane that is essentially parallel to a surface of the lens. The adhesive edge 15 is a cylindrical element which is cut off in the longitudinal direction to form a flattened face. The flattened faces are arranged so as to face one another. The one end face 19 of the adhesive edge 15 which is facing an eyeglass lens surface in the mounted position is used for attachment to an eyeglass lens surface (compare FIG. 21). At its end which is facing away from the eyeglass lens surface in the mounted position, the adhesive edge 15 is provided with a circumferential recess or groove 20 extending transversely to the longitudinal direction of the adhesive edge. The recess 20 is limited radially toward the inside by way of a central attachment post 21. In the mounted position (FIG. 21), the snap hook 18 sits in the recess 20 and embraces the attachment post 21. Depending on the arrangement of the recess 20 at the adhesive edge 15, the distance 24 between the eyeglass lens 9 and the hyperocular lens 3 can be varied in the direction of the arrow. It is also possible to vary the distance 24 if adhesive edges 15 are provided with different lengths or heights. The mounting of a hyperocular lens assembly according to the invention takes place quite simply by first attaching the adhesive edges 15 to the lens 3 by inserting the snap hooks 18 into the recess 20 and pushing the snap hook 18 over the attachment post 21. The hyperocular lens assembly preassembled in this manner is then glued onto the eyeglass lens surface. So as to be able to easily clean the regions 22 of the eyeglass lens surface disposed behind the lens 3, the lens 3 can simply be removed from the adhesive edges by moving it in the direction of arrow 23. In this manner it is also possible to replace the lenses 3.

Figure 8:
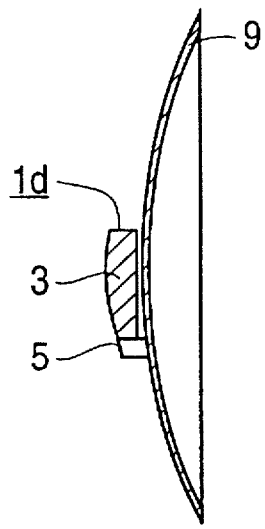
Figure 22:
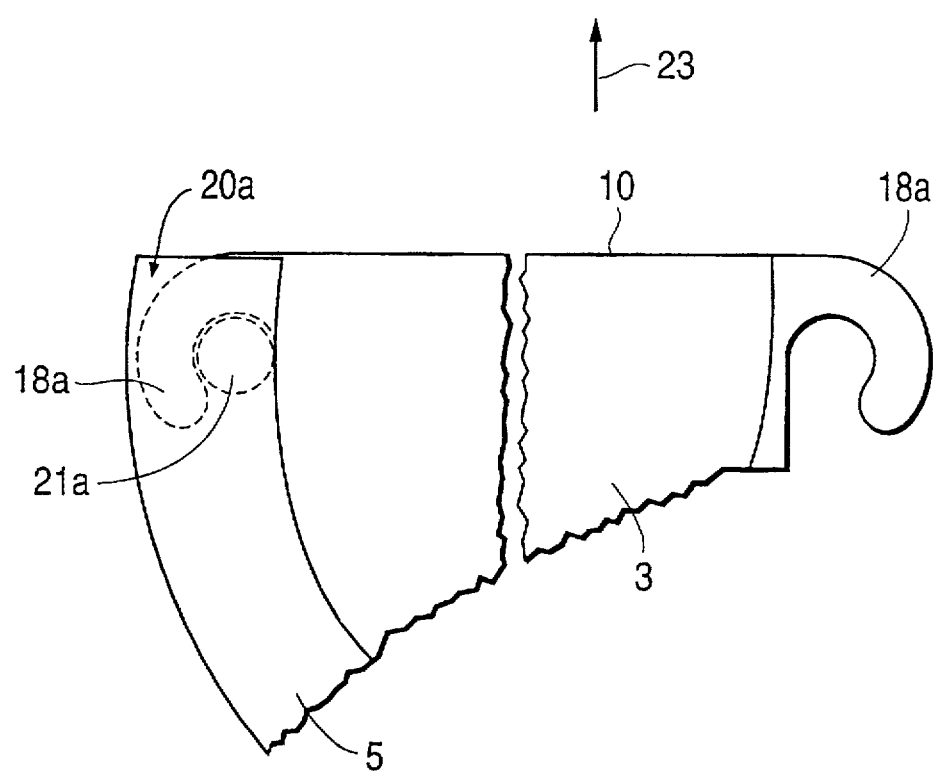

FIG. 22 illustrates a hyperocular lens assembly according to FIGS. 7 and 8. A snap hook 18a adjoining the upper edge 10 of the lens 3 is formed to the circle segment-shaped lens 3 on each side. The holding frame 5 is provided with a configuration which corresponds to the adhesive edge 15 of FIGS. 20A, 20B, and 21, namely a recess 20a, in the region allocated to the snap hook 18a in the mounted position, and with an attachment post 21a. The attachment at or the distance from the holding frame 5 takes place in a manner which is the same, in principle, as in the embodiment according to FIGS. 20A, 20B, and 21.

The invention now being fully described, it will be apparent to one of ordinary skill in the art that any changes and modifications can be made thereto without departing from the spirit or scope of the invention as set forth herein.

What is claimed:

1. A hyperocular lens assembly for an eyeglass lens, comprising:

a lens;

at least one holding element for holding said lens, said holding element only partially surrounding said lens and being securable directly on a surface of the eyeglass lens at one of a location behind and before the eyeglass lens; and a snap connection for detachably securing said lens to said holding element.

2. The hyperocular lens assembly according to claim 1, wherein said lens has an oblong shape defined by two oppositely located long sides extending in a direction of a visual field width, and two oppositely located narrow sides.

and wherein said at least one holding element comprises two adhesive edges, each holding an edge of said lens at the respective narrow sides.

3. The hyperocular lens assembly according to claim 2, wherein the eyeglass lens comprises a bifocal eyeglass lens, and said two adhesive edges attach said lens to the bifocal eyeglass lens so as to create at least three ranges of vision.

4. The hyperocular lens assembly according to claim 2, wherein said adhesive edges extend over an entire width of said lens at the respective narrow sides.

5. The hyperocular lens assembly according to claim 2, wherein said snap connection comprises two snap hooks, each being formed on a respective narrow side of said lens, and each extending in a plane that is essentially parallel to a surface of said lens, said adhesive edges each including a recess extending radially inward relative to a perimeter of the adhesive edge, and having a central attachment post defining an inner limit of the recess, each snap hook surrounding a respective central attachment post to detachably secure said lens to said adhesive edges.

6. The hyperocular lens assembly according to claim 2, wherein each adhesive edge comprises a substantially cylindrical element having a flattened face extending a length thereof whereby said adhesive edge has a circle segment-shaped cross section, said flattened faces being arranged on the eyeglass lens so as to face one another.

7. The hyperocular lens assembly according to claim 4, wherein a distance from said lens to a surface of the eyeglass lens is adjustable.

8. The hyperocular lens assembly according to claim 1, wherein said lens has a circle segment shape, and wherein said holding element comprises a holding frame that surrounds a circular arc-shaped edge of said lens.

9. The hyperocular lens assembly according to claim 8, wherein said snap connection comprises two snap hooks, each being formed on a respective end of the circular arc-shaped edge of said lens, and each extending in a plane that is essentially parallel to a surface of said lens, said holding frame including a recess with two attachment posts located therein, each snap hook surrounding a respective attachment post to detachably secure said lens to said holding frame.

10. The hyperocular lens assembly according to claim 8, wherein said holding frame is attached to a surface of the eyeglass lens at only three different spots.

11. The hyperocular lens assembly according to claim 8, wherein said holding frame is comprised of one of a highly flexible material, and a soft, plastic material.

12. The hyperocular lens assembly according to claim 11, wherein the soft, plastic material comprises a foam material.

13. The hyperocular lens assembly according to claim 8, wherein said holding frame has an end face facing the eyeglass lens, said end face having a contour corresponding to a surface contour of the eyeglass lens, and being bondable to the eyeglass lens at one of a location behind and before the eyeglass lens.

* * * * *